United States Patent [19]

Baltins et al.

[11] Patent Number: 5,544,526
[45] Date of Patent: Aug. 13, 1996

[54] COMBINED AIRCRAFT ANGLE OF ATTACK AND DYNAMIC/STATIC PRESSURE SENSOR ASSEMBLY

[75] Inventors: Guntis U. Baltins, Charlottesville; Russell W. Boyle, Earlysville; Denis G. Mason, Charlottesville; Howard M. Moore, Stanardsville; A. DeBow Owen, Charlottesville; Joseph A. Sharp, Stanardsville, all of Va.

[73] Assignee: Avionics Specialties, Inc., Earlysville, Va.

[21] Appl. No.: 268,919

[22] Filed: Jun. 30, 1994

[51] Int. Cl.⁶ .............................. G01C 21/00; G01F 1/46
[52] U.S. Cl. ........................... 73/180; 73/182; 73/861.67
[58] Field of Search ........................... 73/170.01, 170.02, 73/170.07, 180, 181, 182, 861.65, 861.66, 861.67, 861.68

[56] References Cited

U.S. PATENT DOCUMENTS

| | | | |
|---|---|---|---|
| 2,445,746 | 7/1948 | Raspet | 23/170.01 |
| 2,699,065 | 1/1955 | Blair | 73/180 |
| 2,701,473 | 2/1955 | Fieldgate | 23/170.02 |
| 2,971,375 | 2/1961 | Fieldgate | 73/180 |
| 2,995,930 | 8/1961 | Bucalo | 23/170.01 |
| 3,514,997 | 6/1970 | Gwathmey et al. | 23/180 |
| 4,836,019 | 6/1989 | Hagen et al. | 73/861.65 |
| 5,099,686 | 3/1992 | Köhler | 73/182 |

*Primary Examiner*—Richard Chilcot
*Assistant Examiner*—William L. Oen
*Attorney, Agent, or Firm*—Nixon & Vanderhye P.C.

[57] ABSTRACT

A rotatable airstream direction probe is additionally provided with a dynamic pressure sensing port positioned substantially midway between a pair of pneumatic sensing ports with respect to the probe's stagnation line. Pneumatic output ports may thus be provided, each of which communicates with a respective one of the pneumatic sensing and dynamic sensing ports in the probe. The pressure outputs from such output ports may thus be indicative of static and dynamic pressure of an airstream so as to be capable of determining flight information of an aircraft such as airspeed, altitude and vertical speed.

31 Claims, 4 Drawing Sheets

COMBINED AIRCRAFT ANGLE OF ATTACK AND DYNAMIC/STATIC PRESSURE SENSOR ASSEMBLY

FIELD OF INVENTION

The present invention relates generally to aircraft sensor assemblies from which flight data may be derived by aircraft instrumentation and/or on-board flight director systems. In preferred embodiments, the present invention relates to a sensor assembly which combines the ability to sense the direction of an airstream relative to the aircraft's flight attitude as well as the dynamic/static pressure conditions of the airstream.

BACKGROUND AND SUMMARY OF THE INVENTION

Aircraft derive flight data information from airstream probes of various types. For example, probes have been devised for detecting the direction of an airstream relative to the flight attitude of the aircraft and used to determine the aircraft's angle of attack and/or angle of side slip. In this regard, one particularly popular type of airstream direction probe that has been widely used on aircraft in recent years involves a probe which is rotatable about its longitudinal axis and which extends laterally into the airstream.

The conventional probe most preferably has a conical geometry, but a cylindrical probe geometry is also possible. When the probe is embodied in a conical geometry, elongated entry ports for the pneumatic signals are arranged in the probe's conical surface, preferably in planes containing the axis of the probe so that the ports also converge in a direction outwardly toward the probe's free end, and the space within the cone being divided by a partition. These elongated ports are also circumferentially spaced apart by a predetermined amount (substantially less than 180°) so that each presents itself to the airstream on opposite sides of a stagnation line (which is the imaginary line along the surface of the probe which is presented directly to the airstream). The probe will therefore automatically seek a balance point at which the pneumatic pressures are equal in the two ports. See, for example, U.S. Pat. Nos. 2,971,375; 2,995,930; 2,445,746; 2,701,473; and 3,514,997 (the entire content of each such patent being expressly incorporated hereinto by reference).

Aircraft also typically have a pitot-static system which detects impact (ram) pressure of the airstream and the ambient atmospheric pressure. The impact pressure is typically taken from a pitot tube, mounted parallel to the longitudinal axis of the aircraft and generally in line with the relative airstream. The atmospheric (static) pressure is typically taken from static ports which can be flush-mounted to the aircraft fuselage (and thereby not affected significantly by the relative airstream), or static ports associated with the pitot tube. The sensed ram and static pressures can thus be used to derive useful flight information, such as airspeed, altitude and vertical speed.

One problem associated with conventional pitot-static systems is that the impact pressure sensed by the pitot tube or like ram air sensing probe varies with the aircraft's angle of attack and/or angle of side slip. Thus, the instruments employed in conventional pitot-static systems typically need to be calibrated and/or the pressure signals must be conditioned using on-board computing equipment in order to obtain highly accurate flight data information (i.e., so as to prevent errors which are a function of the angle of attack and/or side slip). It would therefore be desirable if an aircraft airstream direction probe could not only be employed to determine an aircraft's angle of attack and/or side slip, but also be employed to determine the dynamic and static pressures of the airstream so that self-compensating pressure information could be obtained. It is towards providing such a probe that the present invention is directed.

Broadly, the present invention is embodied in a rotatable airstream direction probe which is additionally provided with a dynamic pressure sensing port positioned substantially midway between a pair of pneumatic sensing ports which are symmetrically positioned with respect to the probe's stagnation line. A set of pneumatic output ports may thus be provided each of which communicates with a respective one of the pneumatic sensing ports in the probe.

Thus, when the pneumatic pressures within the paired sensing ports are balanced, the pneumatic pressure at the output port(s) in communication with the sensing ports will be essentially at a pressure $P_1$ which is a monotonic function of static (atmospheric) pressure over a wide range of airspeeds (e.g., from 0.1 Mach to supersonic speeds). The dynamic pressure sensing port, on the other hand, will be presented directly to the airstream when the pressures within the pneumatic sensing ports are balanced. As a result, a dynamic pressure output port which communicates with the dynamic pressure sensing port will exhibit a maximum airstream pressure $P_0$ which is a monotonic function of pitot (ram) pressure over a wide range of airspeeds. These pressures $P_0$ and $P_1$ can thus be converted mathematically into actual pitot (ram) and static (atmospheric) pressures undiluted by any error dependent upon the aircraft's angle of attack (when a single probe is used), and side slip (when multiple probes are used). The output ports can thus be connected operatively to on-board aircraft instrumentation and/or flight directors to derive useful flight data such as airspeed, altitude and vertical speed information.

Further aspects and advantages of this invention will become more clear after careful consideration is given to the following detailed description of the preferred exemplary embodiments thereof.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED

EXEMPLARY EMBODIMENTS

Figure 1:
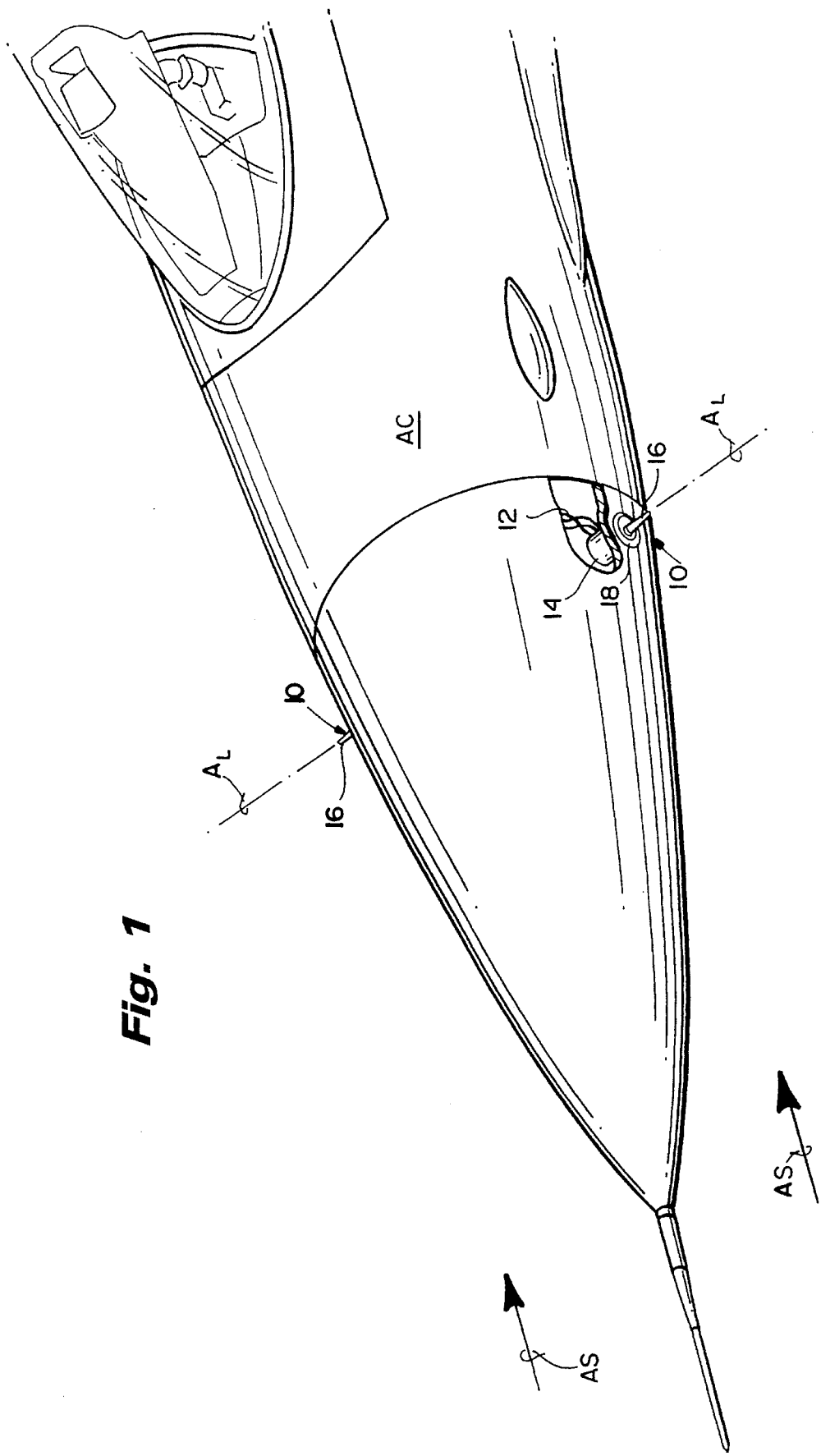
FIG. 1 is a partial perspective view of a forward section of an aircraft showing a pair of preferred sensor assemblies according to the present invention.

Accompanying FIG. 1 shows in perspective view a forward fuselage section of an aircraft AC having a pair of opposed sensor assemblies 10 projecting therefrom in opposite directions along lateral axis $A_L$. Although only a single sensor assembly 10 may be employed, a pair of opposed, laterally projecting probes is especially preferred for redundancy (and hence reliability) purposes, as well as to counteract errors due to aircraft side slip. As is shown, each of the sensor assemblies 10 projects outwardly in a plane normal to the airstream (arrows AS) and will therefore be capable of detecting not only the direction of the airstream relative to the aircraft's flight attitude, but also the dynamic and static pressures of the airstream. The airstream direction/pressure data obtained by the probe may be transferred to the aircraft's on-board flight instrumentation and/or computer-controlled flight director systems via conventional electrical/pneumatic lines 12 connected to the sensor housing 14.

Figure 2:
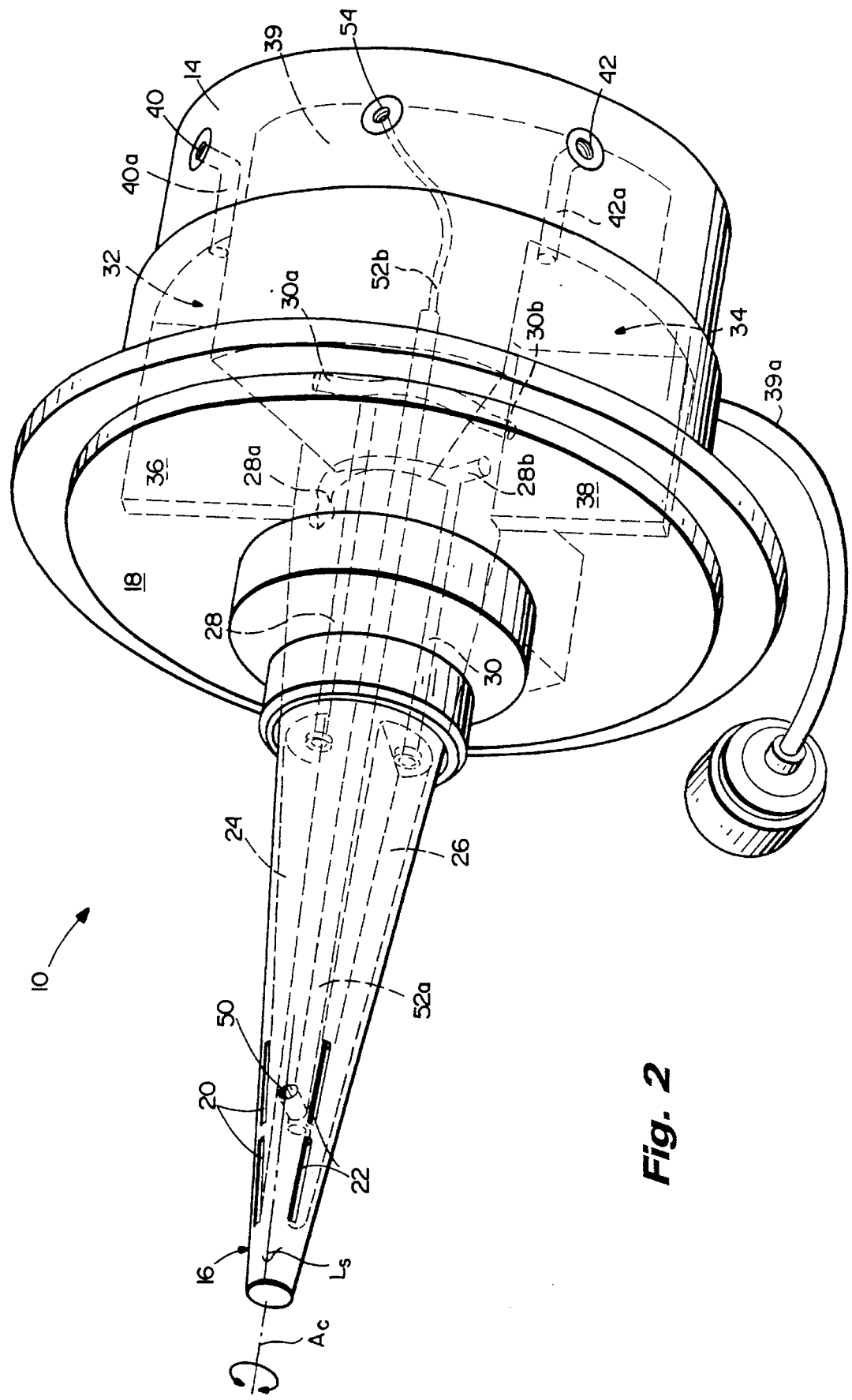
FIG. 2 is an enlarged perspective view of an exemplary sensor assembly according to the present invention shown in FIG. 1.
Figure 3:
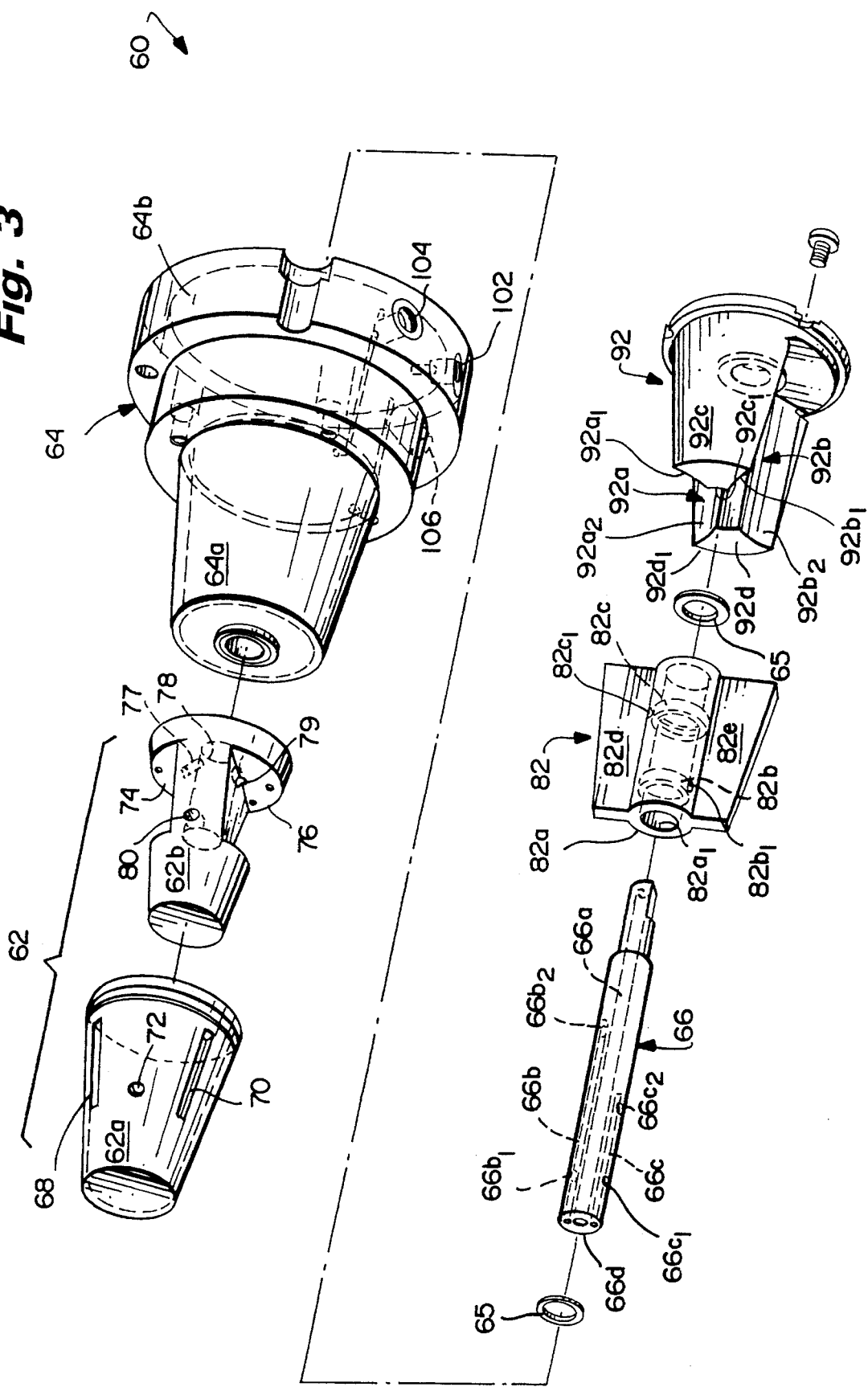
FIG. 3 is an exploded perspective view of another exemplary sensor assembly according to the present invention.
Figure 5:
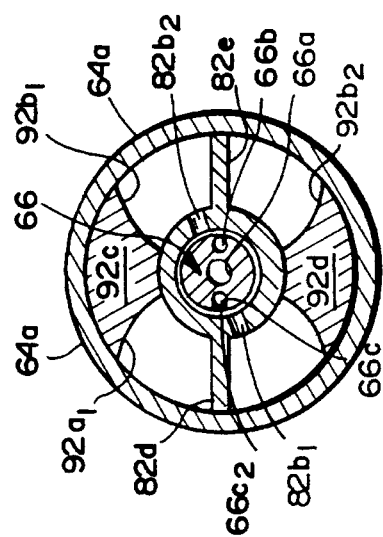
FIG. 5 is a cross-sectional latitudinal view of the sensor assembly shown in FIG. 4 as taken along line 5—5 therein.
Figure 6:
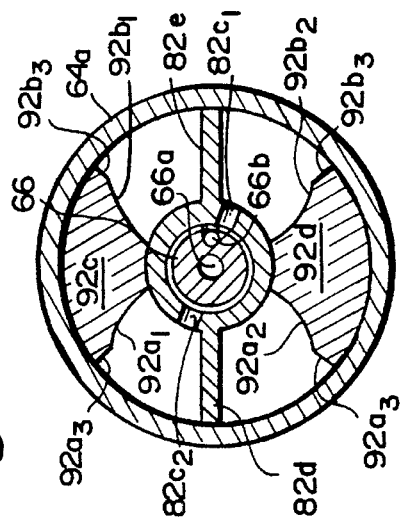
FIG. 6 is another cross-sectional latitudinal view of the sensor assembly shown in FIG. 4 as taken along line 6—6 therein.
Figure 4:
FIG. 4 is a cross-sectional elevational view of the sensor assembly depicted in FIG. 3.

The sensor assembly 10 is shown in an enlarged perspective view in accompanying FIG. 2. As is seen, the sensor assembly 10 is generally comprised of the housing 14, a probe element 16, and a mounting collar 18. The mounting collar 18 is provided so that the sensor assembly 10 may be mounted to the aircraft's fuselage such that the probe element 16 projects laterally therefrom into the airstream, while the housing 14 is located within the fuselage interior (see FIG. 1).

The probe element 16 is conically shaped and includes a pair of circumferentially spaced apart pneumatic sensing ports 20, 22, respectively. Internally, the probe element 16 includes a pair of forward sensing chambers 24, 26 which communicate via pneumatic ducts 28, 30, respectively, with rearward sensing chambers 32, 34 defined within the housing 14. Specifically, the pneumatic ducts 28, 30 include branches 28a, 30a and 28b, 30b which open into the chambers 32 and 34 on either side of the actuator blades 36, 38. The actuator blades 36, 38 are integrally and coaxially connected to the probe element 16, and thus rotate about the probe's central elongate axis $A_c$ as a unit with the probe element 16.

In use, therefore, the probe element 16 will be disturbed from a pressure-balanced state in response to a change in airstream direction (e.g., which may occur due to a change in the aircraft's angle of attack and or side slip). The probe element 16 will thus rotate about its central elongate axis $A_c$ until substantially equivalent pressures occur on opposite sides of the blades 36, 38 within chambers 32 and 34, respectively. That is, upon disturbance from a pressure-balance state, one of the sensing ports 20, 22 will then be presented closer to the stagnation line (or line of highest airstream pressure impinging on the probe element's surface). This relative higher pressure will therefore be communicated to the chambers 32, 34 on one side of each of the blades 36, 38 (depending upon which one of the ports 20, 22 is closer to the stagnation line on the probe element's surface). The differential pressure across the blades 36 and 38 in chambers 32 and 34 will therefore rotate the blades in the direction of the lower pressure side until such time as the pressures on both sides of the blades 36, 38 have again equalized. At this time, the amount of angular rotation of the probe element 16 needed in order for the pressure within chambers 32 and 34 on the opposite sides of blades 36 and 38 to again become substantially equalized is sensed by an electronics angular sensor package 39 housed within the housing 14. The electronics package 39 may be comprised, for example, of a conventional potentiometer or the like so that electronic airstream direction signals may be derived therefrom and transmitted to on-board instrumentation and/or flight director systems via cabling 39a.

When the pressures on both sides of the blades 36 and 38 are equal, the pressure within the chambers 32 and 34 will be at a pressure $P_1$ which is a monotonic function of static (atmospheric) pressure. Therefore, according to the present invention, pneumatic output ports 40, 42 are provided which respectively communicate with the pressure chambers 32, 34, (and hence with the sensing ports 20, 22). The output ports 40, 42 may thus be pneumatically coupled to an aircraft's instrument static pressure lines and used to derive flight data therefrom. The pneumatic pressures from the output ports 40, 42 may, however, be coupled together and pneumatically averaged before being sent as a pneumatic signal indicative of airstream static pressure to the aircraft's instrumentation systems. Such pneumatic averaging will therefore tend to cancel pneumatic output pressure variations which may occur during the momentary upset in pressure-balance as a result of a change of airstream direction (e.g., due to aircraft maneuvering).

In order to render the probe completely useful as a dynamic/static pressure sensor, however, means must be provided to sense the dynamic (ram) pressure of the airstream. According to the present invention, this is accomplished by providing a dynamic pressure sensing port 50 on the frontal surface of the probe element 16, midway between the pneumatic sensing ports 20 and 22. The dynamic pressure sensing port 50 will thus be in a plane which is normal to the elongate axis $A_c$ and positioned circumferentially equidistant between the pneumatic sensing ports 20, 22, and will be positioned on the probe element's stagnation line $L_s$ (i.e., a line of maximum pressure $P_0$ on the probe element's surface due to airstream impingement thereof when the pressure within the chambers 32, 34 is substantially equalized which is in a plane coincident with the probe element's central elongate axis $A_c$). The dynamic pressure $P_0$ sensed by the port 50 communicates with a dynamic pressure output port 54 via internal ducts 52a and 52b. Thus, an aircraft's pitot-static instrumentation (e.g., airspeed indicator, vertical speed indicator and/or altimeter) can be operatively coupled to the ports 40, 42 since the pressures $P_0$ and $P_1$ issuing from the ports 54 and 40, 42, respectively, will closely approximate the pitot and static pressures of the airstream, and can be converted directly to actual pitot and static pressures of the airstream.

Another embodiment of a sensor assembly 60 according to the present invention is depicted in accompanying FIGS. 3–6. In this regard, the sensor assembly 10 described above in relation to FIGS. 1 and 2 is particularly well suited for aircraft operating below airspeeds of about 0.8 Mach. The sensor assembly 60, on the other hand, is especially well suited for use on aircraft operating at airspeeds in excess of 0.8 Mach, and thus may be employed in supersonic aircraft, rockets, missiles and the like.

The sensor assembly 60 includes generally a distal conically shaped probe element 62 rotatably coupled to a housing 64 via a central shaft 66 and bearing washers 65. The probe element 62 itself is composed of an external hollow cone-shaped shell 62a and an internal insert member 62b. The shell 62a defines a pair of pneumatic sensing slots 68, 70 and a dynamic pressure sensing port 72. The insert member 62 defines opposed cut-out regions 74, 76 which form interior chambers 74a, 76a (see FIG. 4) collectively with the interior surface of the shell 62a when the member 62b is inserted therein. These chambers 74a, 76a thus communicate with a respective one of the pneumatic ports 68, 70 and with a central blind duct 78 (via passageways 77, 79). A dynamic pressure duct 80 establishes communication between the port 72 when the member 62b is inserted into the hollow conical shell 62a and the duct 78.

The shaft 66 incudes a coaxial central duct 66a and a pair of lateral ducts 66b, 66c, respectively, situated on diametrically opposed sides of the central duct 66a. The lateral ducts 66b, 66c, are each provided with upper inlet ports $66b_1$, $66c_1$ and lower discharge ports $66b_2$, $66c_2$, respectively. The axial length of the shaft 66 is such that, when inserted into the central blind duct 78 of the insert member 62b, the top surface of the shaft 66 is positioned below the port 80, while the inlet ports $66b_1$, $66c_1$ are aligned with the passageways 77, 79, respectively. The lateral ducts 66b, 66c are sealed against fluid leakage at the top surface 66d of shaft 66 with any suitable means, e.g., epoxy resins, solder, or the like.

The discharge ports $66b_2$, $66c_2$, on the other hand, are in communication with annular channels 82b, 82c formed in the interior cylindrical surface $82a_1$ of the hub 82a. Thus, when the interior cylindrical surface $82a_1$ of the hub 82a is rigidly sleeved over the exterior surface of the shaft 66 (i.e., so that the blade member 82 is integrally connected to the probe element 62), the annular channels 82b, 82c will respectively be in communication with the chambers 74a, 76a —i.e., via ducts 66b, 66c and passageways 77, 79, respectively.

The blade member 82 is rotatably received within the stator member 90 such that the cylindrical exterior surface of the hub 82a can rotatably move with very small clearance with respect to the opposed conforming arcuate surfaces $92c_1$, $92d_1$ formed on the stator posts 92c, 92d, respectively. The diametrically opposed blades 82d, 82e which are unitarily formed with the central cylindrical hub 82a of blade member 82 are thus moveable within pockets 92a, 92b formed in the stator member 92. These pockets 92a, 92b are more particularly established by opposed arcuate surfaces $92a_1$, $92a_2$ and $92b_1$, $92b_2$ formed in each of the stator posts 92c, 92d. The pockets 92a, 92b will thus establish pressure sensing chambers 94, 96 with the interior conical surface of the conical housing section 64a (see FIG. 4). The annular channels 82b, 82c thus communicate with these chambers 94, 96 on respective opposite sides of the opposed blades 82d, 82e via discharge ports $82b_1$, $82b_2$ and $82c_1$, $82c_2$, respectively.

The lower regions of the stator posts 92c, 92d are provided with stop surfaces $92a_3$, $92b_3$. Thus, during operation of the probe assembly 60, the blades 82d, 82e may come into contact with these stop surfaces $92a_3$, $92b_3$ so as to establish the rotational limit thereof. The blades 82d, 82e, however, will as a result of the arcuate surfaces $92a_1$, $92a_2$ and $92b_1$, $92b_2$ formed in each of the stator posts 92c, 92d still define a slight, but meaningful, portion of chambers 74a, 76a so as to allow the free flow of air thereinto which, in turn, drives the blades 82d, 82e to their pressure-balanced state. As a result, the arcuate surfaces $92a_1$, $92a_2$ and $92b_1$, $92b_2$ prevent the blades 82d, 82e from becoming pressure locked against the stator posts 92c, 92d.

Similar to the sensor assembly 10 discussed above with respect to FIGS. 1 and 2, the sensor assembly 60 shown in FIGS. 3–6 may be provided with a conventional electronics package 100 comprised, for example, of a conventional potentiometer or the like, coupled operatively to the proximal end 66e of shaft 66 (see FIG. 4) so that electronic airstream direction signals may be derived therefrom. The duct 66a and the chambers 74a, 76a are each respectively connected for communication with outlet ports 102, 104 and 106, respectively, formed in the proximal section 64b of housing 64. Thus, an aircraft's pitot-static instrumentation (e.g., airspeed indicator, vertical speed indicator and/or altimeter) can be operatively coupled to the ports 102, 104 and 106 since the pressures $P_0$ and $P_1$ issuing from the ports 102 and 104, 106, respectively, will closely approximate the pitot and static pressures of the airstream, and can be converted directly to actual pitot and static pressures by on-board electronics and/or pneumatics signal processors using mathematical algorithms.

The pneumatic sensing ports have been shown in the drawings as being slot-shaped. However, it will be recognized that virtual any geometric configuration could be employed within design parameters known to those in this art for airstream direction probes. furthermore, those in this art will appreciate that the probes according to this invention will also be provided with drain ports so as to allow moisture drainage and with internal electrical heater elements so as to permit the probe to remain functional when in-flight icing conditions are encountered.

In a similar fashion, the probe element has been shown and described as having a conical geometry However, it will be recognized by those skilled in this art that various other axisymmetric probe configurations and geometries can be employed to perform the sensing functions described previously with respect to the conical probe element.

Thus, while the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A combined aircraft angle of attack and dynamic/static pressure sensor assembly for aircraft comprising:

a proximal housing;

a distal probe element defining an exterior surface adapted for lateral projection from the aircraft along a projection axis into an airstream flowing substantially normally to said projection axis, said probe element being mounted to said housing for rotational movement about said projection axis;

a pair of circumferentially spaced-apart pneumatic sensing ports formed in said exterior surface of said probe element;

a dynamic pressure sensing port formed in said exterior surface of said probe element and disposed substantially circumferentially midway between said pair of pneumatic sensing ports; and output ports communicating respectively with said pair of pneumatic sensing ports and said dynamic pressure sensing port, wherein said exterior surface of said probe element rotates about said projection angle in response to a pressure balance upset between said sensing ports to cause said sensing ports to be rotatably realigned relative to said airstream so as to reestablish a pressure balanced condition therebetween, and to cause said dynamic pressure sensing port to be rotatably disposed in a line of maximum pressure on the exterior surface of said probe element due to airstream impingement when said sensing ports are in said pressure balanced condition.

2. A sensor assembly as in claim 1, wherein said base housing further comprises:

a pair of sensing chambers; and fluid passageways which establish communication between respective ones of said sensing chambers and said sensing ports; wherein at least one of said output ports communicates with said pair of sensing chambers.

3. A sensor assembly as in claim 2, further comprising an opposed pair of blades disposed in respective ones of said sensing chambers and connected to said probe element.

4. A sensor assembly as in claim 3, wherein said opposed pair of blades is integrally and coaxially connected to said probe element.

5. A sensor assembly as in claim 3, wherein said fluid passageways establish communication between said sensing ports and said sensing chambers on opposite sides of each of said blades so as to cause said blades to rotate within said sensing chambers to a balanced pressure state.

6. A sensor assembly as in claim 1, wherein said probe element has a conical geometry.

7. A sensor assembly as in claim 1, wherein said probe element includes:

a conically shaped shell which defines said pair of sensing ports and said dynamic pressure port; and an internal insert member which defines an opposed pair of cut-out regions which establish interior chambers in communication with respective ones of said pneumatic sensing ports collectively with an interior surface of said shell.

8. A sensor assembly as in claim 7, wherein said probe element includes a central shaft coaxially positioned with respect to said projection axis.

9. A sensor assembly as in claim 8, wherein said central shaft includes a first passageway which establishes communication between said dynamic pressure sensing port and one of said output ports.

10. A sensor assembly as in claim 9, wherein said central shaft includes a pair of second passageways which establish communication between said pneumatic sensing ports and respective ones of said output ports.

11. A sensor assembly as in claim 8, wherein said probe element includes a blade member having a central cylindrical hub coaxially sleeved over said shaft, and a pair of diametrically opposed blades extending outwardly from said hub.

12. A sensor assembly as in claim 9, wherein said probe element includes a blade member having a central cylindrical hub coaxially sleeved over said shaft, and a pair of diametrically opposed blades extending outwardly from said hub; and wherein said central hub includes a pair of annular channels each in communication with a respective one of said second passageways.

13. A sensor assembly as in claim 12, wherein said central cylindrical hub includes discharge ports disposed on opposite sides of said blades and in communication with respective ones of said annular channels.

14. A sensor assembly as in claim 11 or 12, wherein said base housing includes a stator member having an opposed pair of stator posts which establish opposed pockets in which said blades are respectively moveable.

15. A sensor assembly as in claim 14, wherein said stator posts define an opposed pair of arcuate surfaces which prevent said blades from becoming pressure-locked against said stator posts.

16. A sensor assembly as in claim 15, wherein said stator posts includes stop surfaces to limit rotational movement of said blades.

17. A sensor assembly as in claim 14, wherein said stator posts define opposed central arcuate bearing surfaces conforming to an exterior surface of said hub of said blade member.

18. A sensor assembly as in claim 1 or 7, wherein said sensing ports are slot-shaped.

19. A sensor assembly for determining direction of an airstream relative to an aircraft in flight and dynamic and static pressure conditions associated with the airstream, said sensor assembly comprising:

an elongate rotatable sensing probe element having an exterior surface adapted to being oriented laterally with respect to the aircraft in flight so as to project into the airstream along a projection axis such that the airstream impinges upon the sensing probe substantially normally to said projection axis;

a pair of circumferentially spaced-apart pneumatic sensing ports formed in said exterior surface of said probe element;

a dynamic sensing port formed in said probe element formed in said exterior surface substantially circumferentially equidistantly between said pair of pneumatic sensing ports;

an angular position sensor operatively connected to said probe element; and pneumatic output ports respectively in communication with said pneumatic sensing and dynamic sensing ports; wherein said pneumatic sensing ports sense a change in the direction of the airstream, and in response thereto, cause said sensing probe element to rotate about said projection axis until a pressure-balanced state is achieved, said angular position sensor determining the angular rotation of said probe element which is indicative of airstream direction, and wherein said dynamic sensing port rotates concurrently with said pneumatic sensing ports to be disposed in a line of maximum airstream pressure impinging on said exterior surface of said sensing probe when said pneumatic sensing ports are in said pressure-balanced state such that said output ports in communication with said pneumatic sensing and dynamic sensing ports thereby sense pressures which are indicative of static and dynamic pressures, respectively, of the airstream when said probe element is in said pressure-balanced state.

20. A sensor assembly as in claim 19, wherein said angular position sensor is a potentiometer.

21. A sensor assembly comprising:

a housing;

a probe element mounted to said housing for rotational movement about a projection axis;

a pair of circumferentially spaced-apart pneumatic sensing ports formed in said probe element;

a stator member mounted in an interior region of said base housing and having a pair of stator posts which define a respective pair of sensing chambers collectively with said interior region of said base housing;

a central shaft rotatably connecting said probe element to said base housing;

a blade member having a central tubular hub rotatably received between said pair of stator posts and rigidly sleeved over said central shaft so that said blade member and said central shaft rotate as a unit, and a pair of opposed blades extending outwardly from said tubular hub within said established sensing chambers; and a pair of ducts formed in said central shaft and said blade member which fluid-communicate said pneumatic sensing ports and said established sensing chambers.

22. A sensor assembly as in claim 21, wherein said pair of ducts each include an annular channel formed in said tubular hub, and a discharge ports disposed on opposite sides of said blades.

23. A sensor assembly as in claim 21, wherein a portion of said established chambers is defined by opposed pairs of arcuate surfaces formed on said stator posts.

24. A sensor assembly as in claim 23, wherein said stator posts include stop surfaces to limit movement of said blades within said established chambers.

25. A sensor assembly as in claim 21, wherein said stator posts define opposed arcuate beating surfaces which conform to an exterior surface of said tubular central hub of said blade member.

26. A sensor assembly as in claim 21, wherein said probe element includes a dynamic sensing port disposed substantially equidistantly between said circumferentially spaced-apart pair of pneumatic sensing ports.

27. A sensor assembly as in claim 26, wherein said base housing includes pneumatic output ports in respective fluid-communication with said established sensing chambers and said dynamic sensing port.

28. A sensor assembly as in claim 27, wherein said central shaft includes a central duct which establishes fluid communication between said dynamic sensing port and a respective one of said pneumatic output ports.

29. A sensor assembly as in claim 21 or 28, wherein said probe element includes:

an outer shell which defines said pair of pneumatic sensing ports; and an internal insert member which defines an opposed pair of cut-out regions which establish, collectively with an interior surface of said shell, a pair of interior chambers in communication with respective ones of said pneumatic sensing ports.

30. A sensor assembly as in claim 29, wherein said probe element has a conical geometry.

31. A sensor assembly as in claim 21, wherein said probe element has a conical geometry.

* * * * *